July 3, 1923.
R. F. LACE
1,460,385
TIRE CLAMP
Filed July 8, 1920
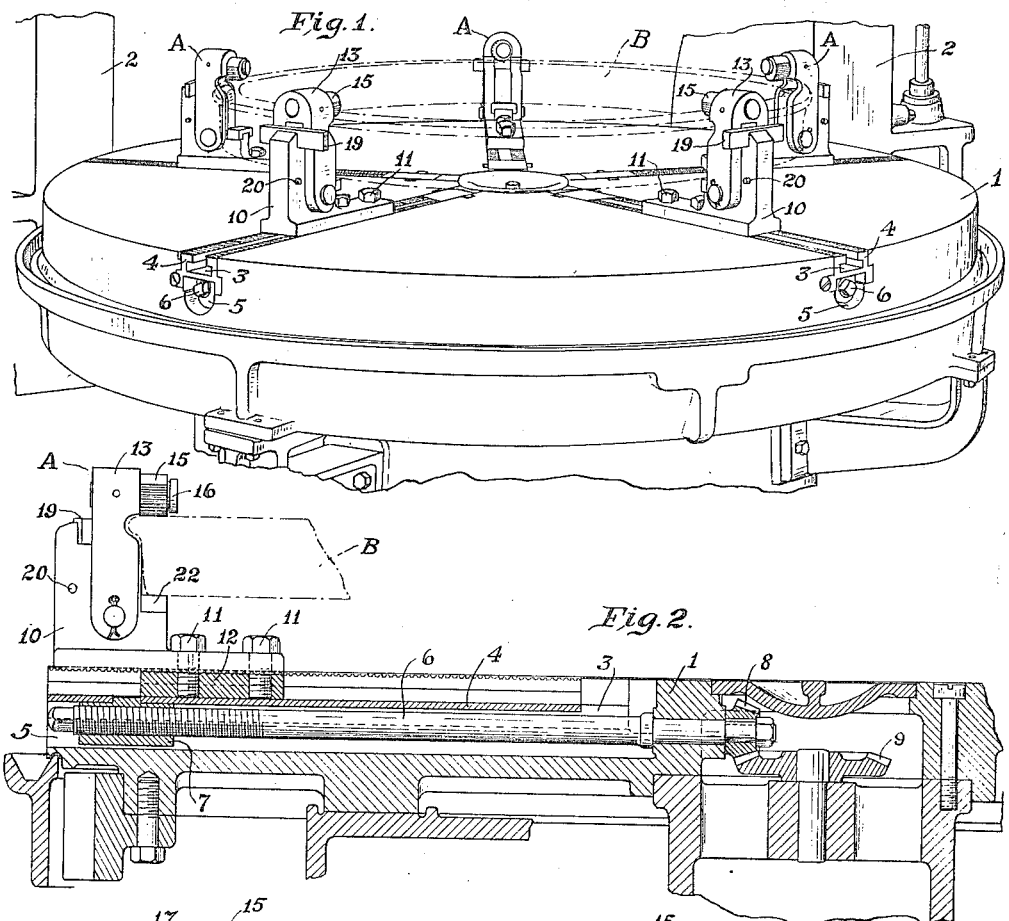
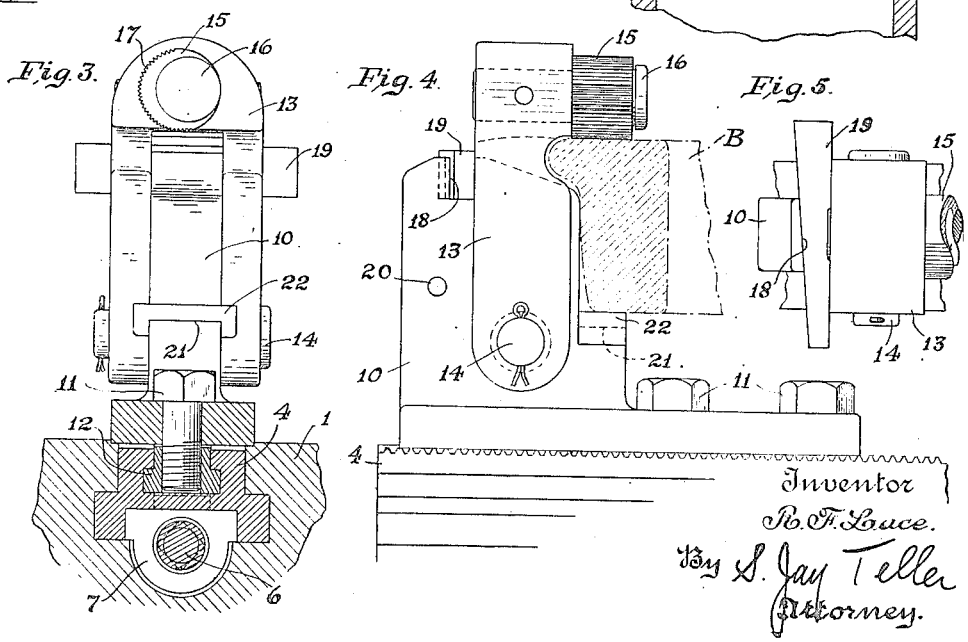
Inventor
R. F. Lace
By S. Jay Teller
Attorney Patented July 3, 1923.

1,460,385

UNITED STATES PATENT OFFICE.

RAYMOND F. LACE, OF COLUMBUS, OHIO, ASSIGNOR TO NILES-BEMENT-POND COMPANY, OF NEW YORK, N. Y., A CORPORATION OF NEW JERSEY.

TIRE CLAMP.

Application filed July 8, 1920. Serial No. 394,613.

*To all whom it may concern:*

Be it known that I, RAYMOND F. LACE, a citizen of the United States, residing at Columbus, in the county of Franklin and State of Ohio, have invented certain new and useful Improvements in Tire Clamps, of which the following is a specification.

The object of the present invention is to provide a clamp or a group of clamps of improved construction adapted for holding a locomotive tire or other similar piece of work in place on the table or face plate of a boring mill, lathe or other machine.

A further and more specific object of the invention is to provide a clamp for the purpose stated having a jaw, which is preferably eccentrically pivoted, and a pivoted carrying member for the jaw which is normally held in place by means of a wedge. In accordance with the invention, the removal of the wedge permits the jaw to be bodily moved out of its work engaging position.

Further objects of the invention will be apparent from the following specification and claims.

In the accompanying drawing, I have illustrated the embodiment of the invention which I now deem preferable, but it will be understood that certain changes may be made within the scope of the appended claims without departing from the spirit of the invention.

Of the drawing:

Figure 1 is a perspective view of the rotary table of a boring mill together with associated parts, the said table being provided with a group of clamping devices embodying the invention.

Fig. 2 is a fragmentary sectional view through the table showing the means for supporting and adjusting one of the clamping devices.

Figs. 3 and 4 are end and side views respectively of a tire clamp embodying the invention.

Fig. 5 is a fragmentary plan view of the clamp shown in Figs. 3 and 4.

Referring to the drawing, particularly Figs. 1 and 2, 1 represents the rotatable table of a boring mill which is or may be of any usual or preferred construction. Associated with the table 1 are uprights 2, 2 and other parts such as are common in boring mills. As the present invention does not reside in the boring mill construction, further and more detailed description of the boring mill can be omitted.

Preferably the table 1 is provided with openings or slots, preferably T-slots, whereby clamps or clamping devices embodying the invention may be secured in place. Each of these clamping devices is indicated in the drawing by the reference character A, five such clamping devices being shown. Preferably, as illustrated, these T-slots 3, 3 are formed in slides 4, 4 which are located in radial slots 5, 5 in the table 1. As illustrated there are five clamping devices and therefore five slides and five slots or guideways therefor.

Located in each of the slots 5, 5 as shown in Fig. 2 is a radially positioned screw 6, the threaded portion of which is in engagement with a nut 7 connected with the slide 4. The screw is held at its inner end against movement inward or outward and is squared at its outer end so that it can readily be turned. It will be seen that when the screw is turned, the slide 4 together with the clamping device A will be moved inward or outward.

By preference I connect all of the screws 6, 6 together so that movement of one of them will cause simultaneous movement of the others and therefore simultaneous movement of all of the slides and all of the clamping devices. As illustrated, each one of the screws 6 has secured to it at its inner end a bevel pinion 8 which meshes with a common centrally disposed bevel gear 9. It will be seen that this bevel gear 9 serves to connect all of the screws and insures their simultaneous rotation.

As already stated, each one of the slides 4 is provided with a T-slot 3 which is utilized for the mounting of the corresponding clamping device A. As illustrated each clamping device comprises a main bracket 10 on which the other parts are mounted and which is adapted to engage directly with the corresponding slide 4. Bolts 11, 11 extend through the bracket 10 into a tongue 12 which is entered in the slot 3. This construction permits the clamping device to be adjusted along the slide. By tightening the bolts 11, 11 the bracket 10 may be held in fixed relation to the corresponding slide. If desired, dependence may be placed entirely on friction for holding the bracket in position with respect to the slide, but as illustrated, the top of the slide and the bottom of the bracket are provided with transverse corrugations or teeth which are adapted to fit each other and to positively prevent movement of the bracket inward or outward with respect to the slide.

I will now refer more in detail to the construction of each clamping device as shown in Figs. 3, 4 and 5. Preferably there is a member 13 pivoted to the bracket 10 for movement about an axis parallel to the surface of the table or face plate 1, and as illustrated the member 13 is in the form of a yoke which embraces the bracket 10 and which is pivoted thereto by means of a pivot pin 14 extending through the bracket and through both parts of the yoke.

In accordance with the present invention, the clamping device A includes a work engaging means positioned to engage the surface of the work that is opposite to the table or face plate. Preferably, though not necessarily, this work engaging means is in the form of an eccentrically pivoted jaw 15 mounted on the bracket 10 for movement about an axis normally parallel to the surface of the table or face plate and perpendicular to the line of movement of the table or face plate. When a pivoted member or yoke 13 is provided, as is preferred and as has already been described, the jaw 15 is mounted on this member or yoke. As illustrated, the member 13 carries a pivot pin 16 which projects radially inward therefrom and on which the jaw 15 is pivotally or rotatably mounted. The aperture in the jaw 15 through which the pivot pin 16 extends is eccentric of the work engaging surface of the jaw and this work engaging surface is preferably toothed or fluted as illustrated at 17 in Fig. 3. It will be seen that the position of the work engaging means or jaw 15 is such that the jaw is adapted to engage the surface of the work which is opposite of the table or face plate.

The main bracket 10 is provided with a recess or notch at 18 adapted to receive a wedge 19. This wedge abuts against the pivoted member or yoke 13 and serves to hold it in its normal operative position as illustrated in the drawing. However, when the wedge 19 is removed, the member 13 can be swung backward about the pivot pin 14 so as to withdraw the work engaging member or jaw 15 from the work. Preferably a stop pin 20 is provided to limit the swinging movement of the member 13.

Preferably as shown the main bracket 10 is provided with a shoulder or abutment at 21 which is adapted to support the work and take the reaction due to the engagement of the jaws 15. As already stated, clamping devices embodying the invention are particularly adapted for holding locomotive tires Inasmuch as such tires frequently vary in thickness, I preferably provide a removable spacing block 22 on each shoulder 21, the tire or other work having direct engagement with the block rather than with the shoulder. By providing different blocks 22 having different thicknesses it is possible to readily adapt the tire clamp for work of different sizes.

In operation the clamping devices are first bodily moved or adjusted on the table or face plate so as to bring them in proper relationship to the tire or other work to be clamped. When the clamping devices are arranged on radial slides as illustrated and described, they are first adjusted manually with respect to the slides so as to lie in approximately the position required for a tire of the particular size to be held, blocks 22 of the proper thickness are selected and put in place and then the tire is laid on the blocks as indicated at B in Fig. 1. Final adjustments of the clamps to bring them closer to the tire may be effected by moving all of the slides 4, 4 radially in the way described.

The tire or other work having been put in place and the clamping devices having been adjusted as described, the work engaging jaws 15 are turned so as to contact with the surface of the work which is opposite to the table or face plate, that is, the upper surface. The eccentricity of the jaws is such that as the table or face plate is rotated or otherwise moved the reaction on the work tends to turn the jaws about their pivotal axes and to force the teeth thereof more firmly into engagement with the work. Thus the work is rigidly and firmly held, and a driving or rotative force is applied sufficient for taking the heaviest cuts.

At the end of the cutting operation when it is desired to release the clamping devices, the several wedges 19, 19 are driven out thus permitting the pivoted members or yokes 13, 13 to swing outward and move the jaws 15, 15 bodily away from the work. This bodily movement of the jaws away from the work is important as otherwise it would be very difficult to disengage them.

In Figs. 1 and 2 of the drawing I have illustrated the clamps as positioned outside of the tire so as to make possible the boring of the interior cylindrical surface of the tire. It will be apparent, however, that the clamps may be reversed in position and located inside of the tire so as to make possible the turning of the outer surface of the tire.

What I claim is:

1. A tire clamp comprising in combination a main bracket adapted to be secured to a machine table or face plate, and a work-engaging toothed jaw carried by the bracket and eccentrically pivoted for movement about an axis normally parallel to the surface of the table or face plate and perpendicular to the line of movement of the table or face plate, the said pivoted jaw being positioned to engage the surface of the work opposite to the table or face plate.

2. A tire clamp comprising in combination a main bracket adapted to be secured to a machine table or face plate, a member pivoted to the bracket for movement about an axis parallel to the surface of the table or face plate, a work-engaging toothed jaw eccentrically pivoted on the said member for movement about an axis normally parallel to the surface of the table or face plate and perpendicular to the line of movement of the table or face plate, the said pivoted jaw being positioned to engage the surface of the work opposite to the table or face plate, and a wedge for supporting the pivoted member in fixed relation to the bracket when the work is engaged by the jaw but adapted to be driven out to release the member and jaw when the work is to be disengaged.

3. A tire clamp comprising in combination a main bracket adapted to be secured to a machine table or face plate, a work-engaging toothed jaw carried by the bracket and eccentrically pivoted for movement about an axis normally parallel to the surface of the table or face plate and perpendicular to the line of movement of the table or face plate, the said pivoted jaw being positioned to engage the surface of the work opposite to the table or face plate, and a removable spacing block carried by the bracket and adapted to engage the work at a position opposite to the position of engagement of the jaw.

4. The combination of a rotatable work table, a plurality of radially adjustable slides on the table, means for simultaneously adjusting all of the slides to the same extent, and a plurality of clamps carried by the respective slide, each clamp comprising a main bracket, a member pivoted to the bracket, work-engaging means and a wedge carried thereby for supporting the pivoted member in fixed relation to the bracket when the work is engaged but adapted to be driven out to release the pivoted member when the work is to be disengaged.

In testimony whereof, I hereto affix my signature.

RAYMOND F. LACE.